United States Patent [19]

Kurihara et al.

[11] 4,423,785

[45] Jan. 3, 1984

[54] LOAD CONTROL DEVICE FOR A WORKING TOOL OF A CONSTRUCTION VEHICLE

[75] Inventors: Keishiro Kurihara, Chigasaki; Tetsuya Nakayama, Fujisawa; Masakazu Moritoki, Hiratsuka, all of Japan

[73] Assignee: Kabushiki Kaisha Komatsu Seisakusho, Tokyo, Japan

[21] Appl. No.: 222,964

[22] Filed: Jan. 7, 1981

[30] Foreign Application Priority Data

Mar. 18, 1980 [JP] Japan ............................... 55-34312
Mar. 25, 1980 [JP] Japan ............................... 55-38085

[51] Int. Cl.³ .................................. A01B 63/112
[52] U.S. Cl. ................................ 172/3; 172/7
[58] Field of Search ............... 172/2, 3, 4.5, 7, 9, 172/10; 37/DIG. 1, DIG. 20

[56] References Cited

U.S. PATENT DOCUMENTS

| | | | |
|---|---|---|---|
| 3,605,903 | 9/1971 | Glesmann | 172/3 |
| 4,053,018 | 10/1977 | Takeda | 172/4.5 |
| 4,077,475 | 3/1978 | Hino et al. | 172/7 X |
| 4,125,166 | 11/1978 | Bergius | 172/3 X |
| 4,162,708 | 7/1979 | Johnson | 37/DIG. 20 X |
| 4,194,574 | 3/1980 | Benson et al. | 172/7 X |
| 4,282,933 | 8/1981 | Suganami et al. | 172/7 X |

Primary Examiner—Richard T. Stouffer
Attorney, Agent, or Firm—Spensley, Horn, Jubas & Lubitz

[57] ABSTRACT

A load control device for a working tool of a construction vehicle in which a signal detected by a speed detector or a traction force detector is fed back to produce a deviation signal between said signal and a desired signal. A memory unit has stored a desired value of speed or traction force for each acceleration and outputs the desired signal corresponding to an acceleration signal from an acceleration detector. The working tool is moved up or down according to the deviation signal and, through the feedback mechanism, the load applied to the working tool is automatically controlled so as to enable the construction vehicle to work at maximum work efficiency without operator's efforts.

8 Claims, 17 Drawing Figures

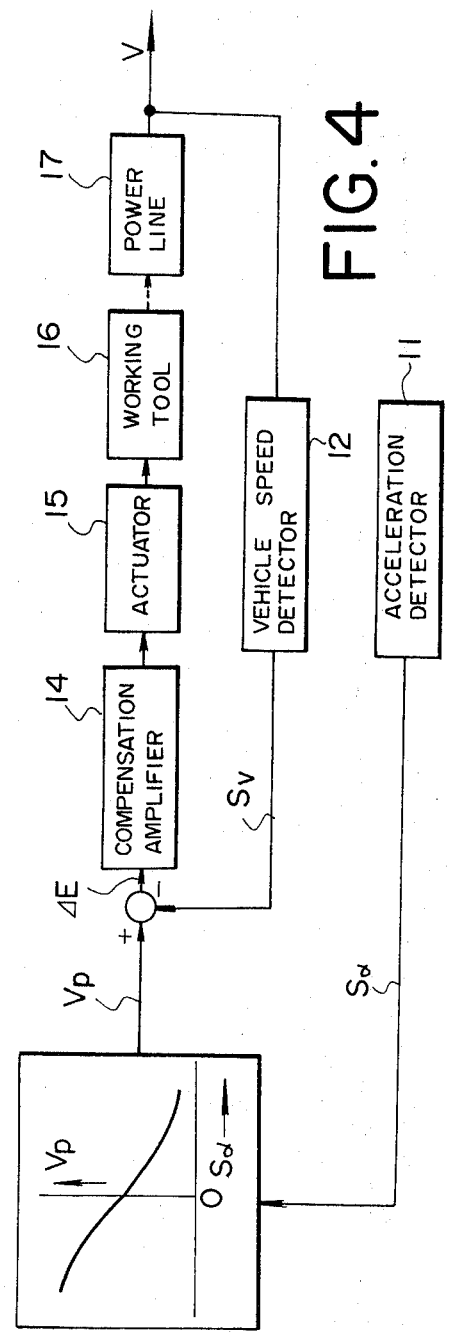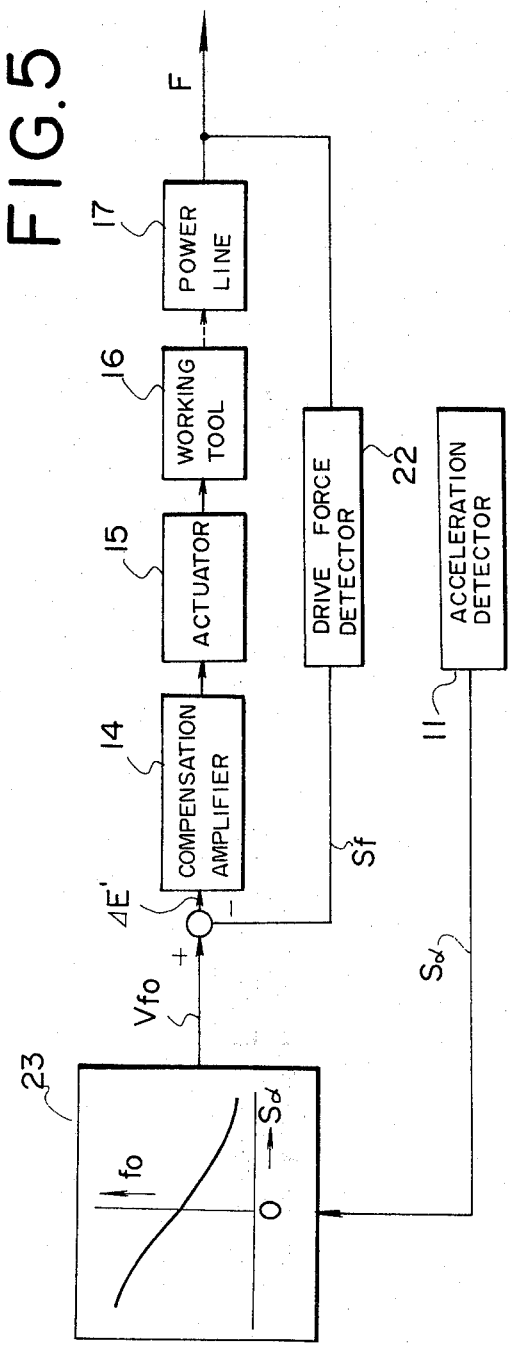

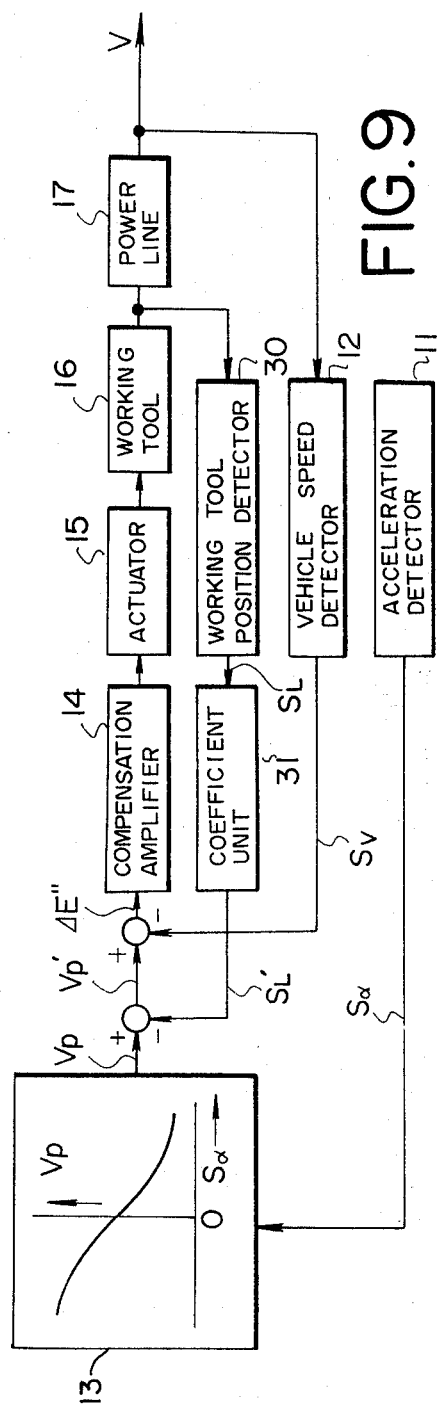
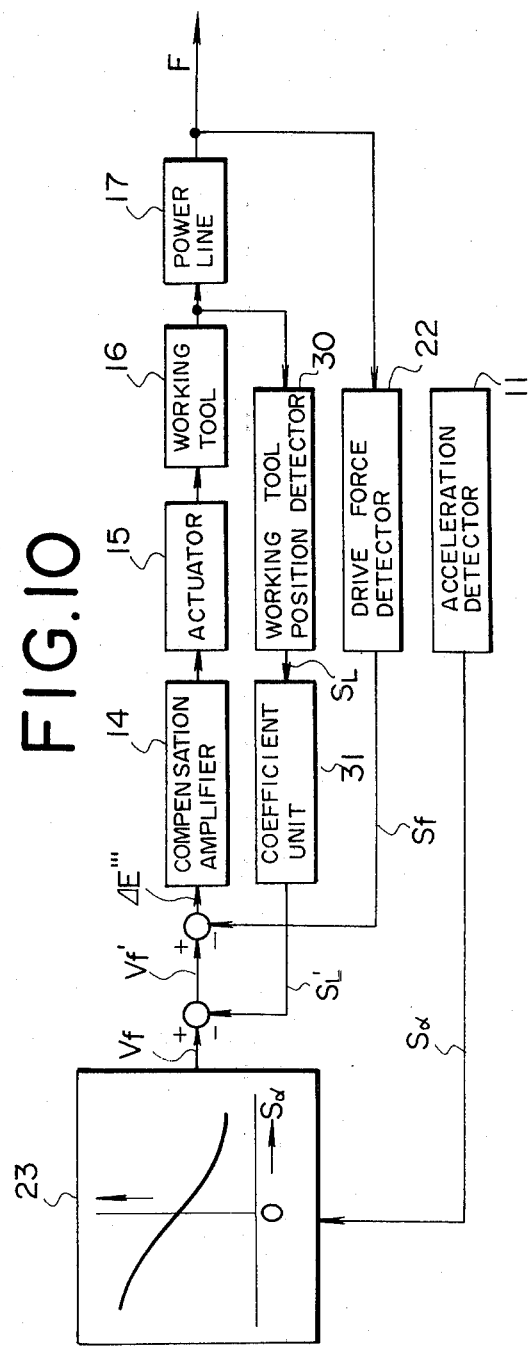

LOAD CONTROL DEVICE FOR A WORKING TOOL OF A CONSTRUCTION VEHICLE

BACKGROUND OF THE INVENTION

This invention relates to a load control device for a working tool of a construction vehicle.

In an earthmoving work with a construction vehicle, it is desirable for the vehicle to be controlled so as always to achieve the maximum work efficiency, i.e., moving maximum amount of soil per hour.

Benson et al. introduced a product of effective draft force value and true ground speed value of a construction vehicle as a measure of an effective draft power of the vehicle by which the maximum work efficiency is achieved (Refer to U.S. Pat. No. 4,194,574). In the system according to Benson et al., the effective draft force and true ground speed are measured and information corresponding to the product of these two values is given to a human operator. With this information, the operator controls the vehicle so as to maximize the effective draft power thereof.

Although it becomes easier to obtain the maximum work efficiency therewith, he system involves control by a human operator in which the operator must always control the vehicle with reference to the information given to him, which continuously demands a certain amount of efforts from the operator.

SUMMARY OF THE INVENTION

Accordingly, the first object of this invention is to provide a working tool load control device in which the above-described operator's efforts accompanying a conventional construction vehicle are eliminated and which provides a maximum work efficiency for a construction vehicle to operate with a maximum effective traction power under various working conditions.

The second object of the invention is to provide a working tool load control device which provides a maximum work efficiency even when the vehicle is being accelerated or working on an inclined ground.

The third object of the invention is to provide a working tool load control device by which the work efficiency is improved by far when compared with that in the prior art without demanding the operator's efforts, and which is simple in construction and low in manufacturing cost.

The fourth object of the invention is to provide a working tool load control device in which, when the construction vehicle is repeatedly operated to level the ground, it is unnecessary to decrease the speed of the vehicle in its backward run, thus reducing the cycle time, and in which it is unnecessary to conduct the preparatory operation before the next work is carried out, and the numbers of times of accelerating the vehicle and of moving up and down the working tool are reduced, thus minimizing the loss of power.

The foregoing objects and other objects as well as the characteristic features of the invention will become more apparent from the following detailed description and the appended claims when read in conjunction with the accompanying drawings.

BRIEF DESCRIPTION OF THE DRAWINGS

In the accompanying drawings:

FIG. 4 is a block diagram showing one example of a load control device according to this invention, in which a vehicle speed value providing a maximum work efficiency is obtained according to the present acceleration, and the load is controlled with the vehicle speed value as a desired value;

FIG. 5 is a block diagram showing another example of the load control device according to the invention, in which a drive force value providing a maximum work efficiency is obtained according to the present acceleration, and the load is controlled with the drive force value as a desired value;

Figures 8A, 8B, 8C:
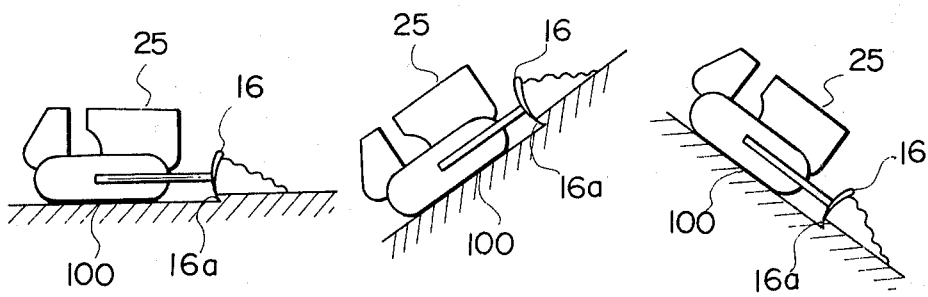
Figure 11:
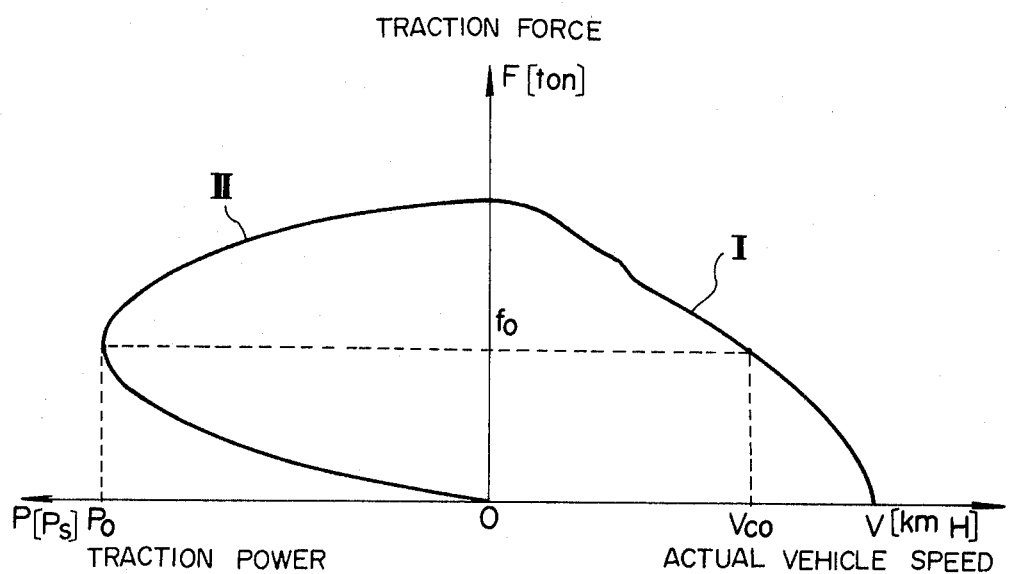
Figure 12:
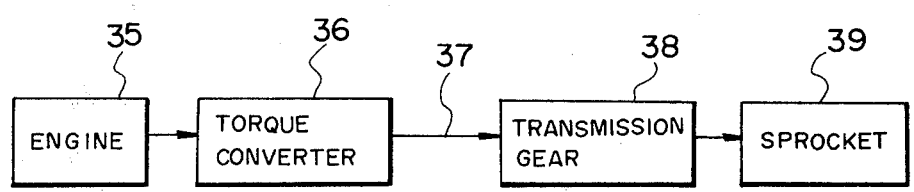
Figure 13:
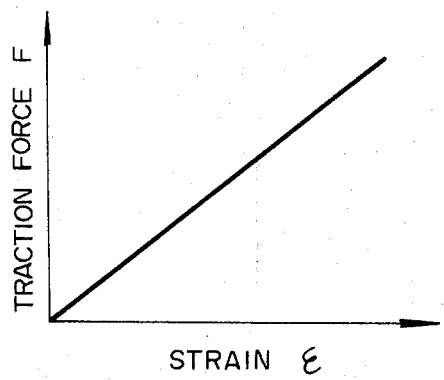
Figure 14:
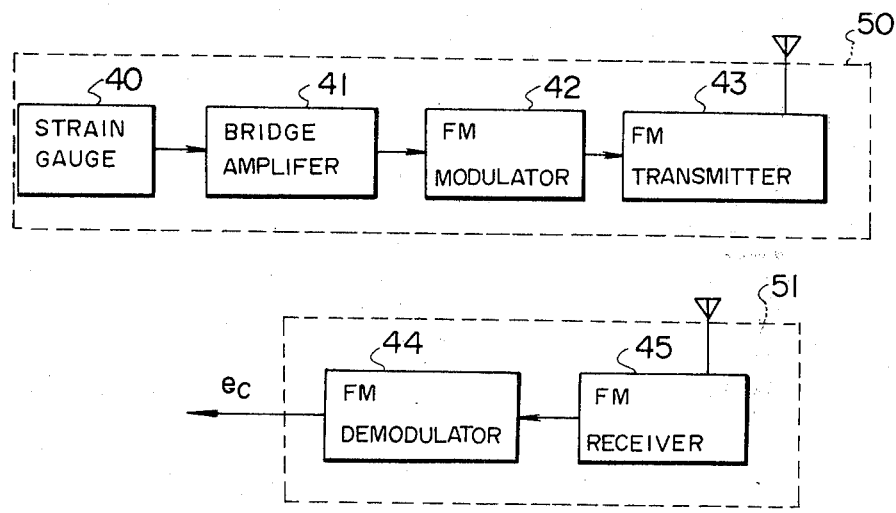
Figure 15:
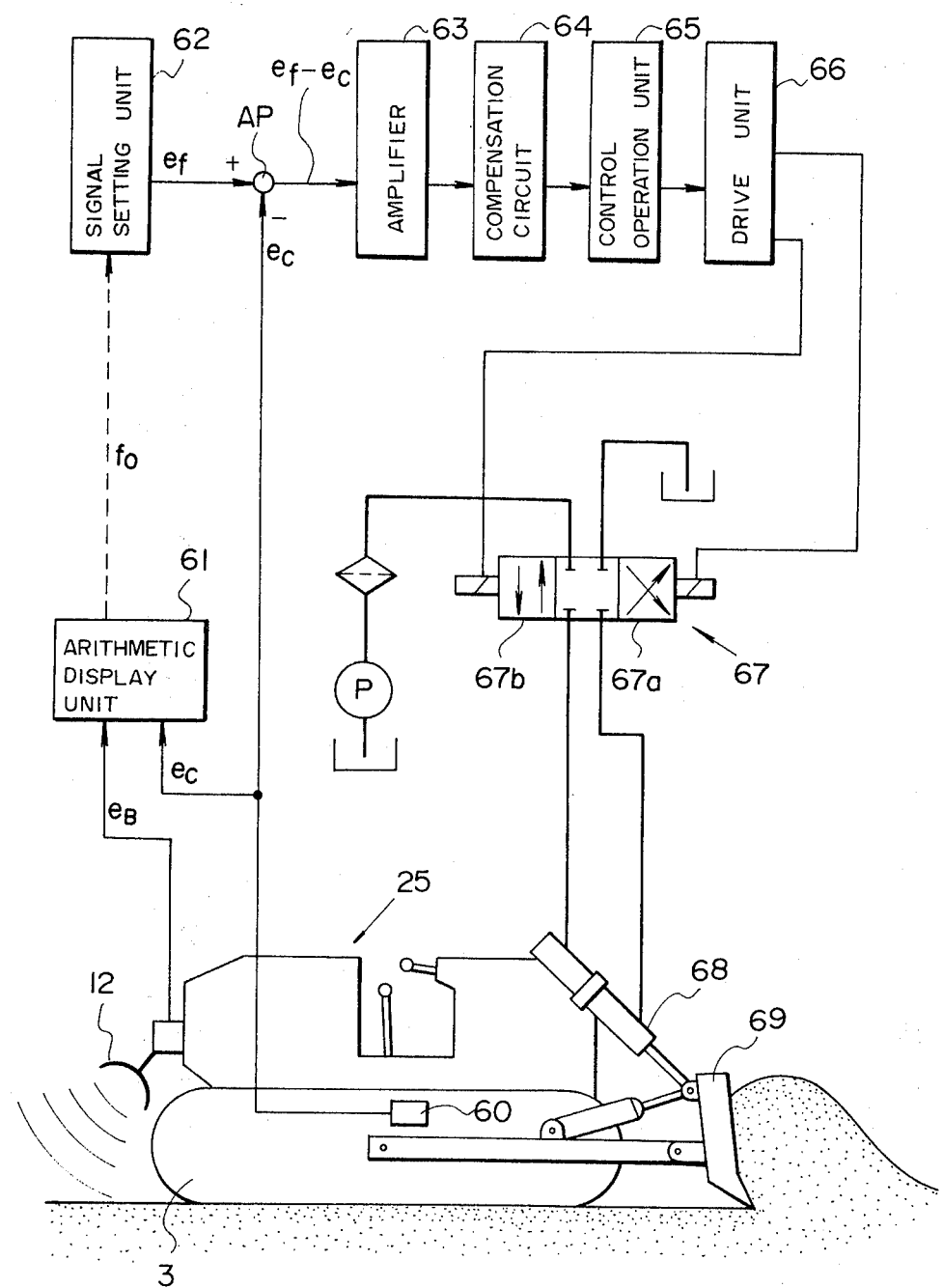
Figure 16:
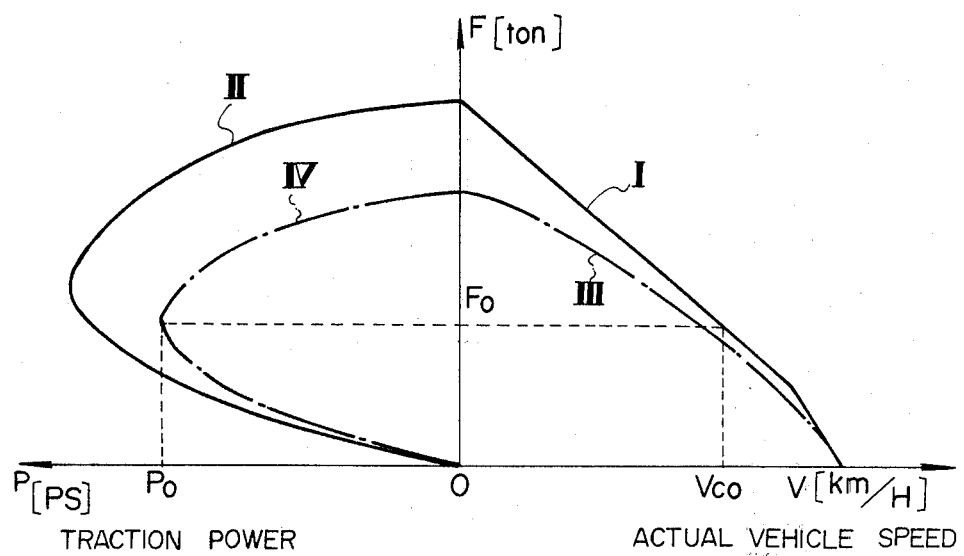
Figure 17:
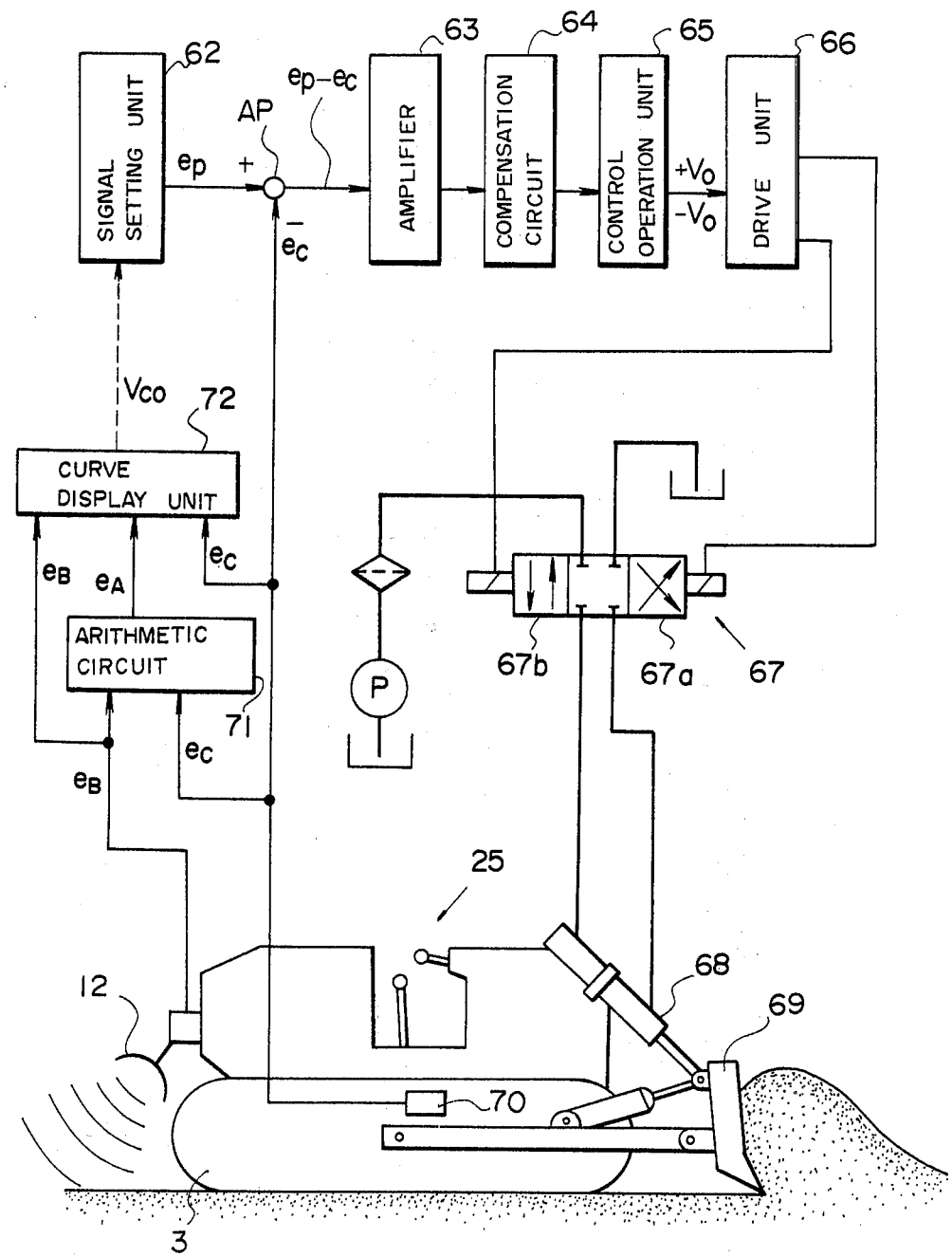

The parts (a), (b) and (c) of FIG. 8 are explanatory diagrams showing working conditions of the bulldozer on the flat grounds;

FIG. 9 is a block diagram showing another example of the load control device according to the invention, similar to the example in FIG. 4, in which a desired vehicle speed value is corrected according to the position of a working tool;

FIG. 10 is a block diagram showing another example of the load control device according to the invention, similar to the example in FIG. 5, in which a desired drive force value is corrected according to the position of a working tool;

FIG. 11 is a graphical representation showing a curve indicating actual construction vehicle speed V with traction force F and curve indicating traction force F with traction power P;

FIG. 12 is a block diagram showing an engine power line;

FIG. 13 is a graphical representation indicating coupling shaft strain $\epsilon$ with traction force F;

FIG. 14 is a block diagram showing a device for reading the output of a strain gauge through FM transmission;

FIG. 15 is a block diagram showing one example of a system in which a desired traction force value is set by using an actual vehicle speed and the present traction force as a desired value to provide a maximum work efficiency, so that the load is controlled according to the value thus set;

FIG. 16 is a graphical representation indicating bulldozer running performance characteristic curves in the case when the bulldozer is under no load, and bulldozer running performance characteristic curves depending on the type of earth at a working site;

FIG. 17 is a block diagram showing one example of a system in which a desired track speed value is set by using an actual vehicle speed and the present track speed as a desired value providing a maximum work efficiency, and the load is controlled according to the desired value.

DETAILED DESCRIPTION OF THE INVENTION

Figure 1:
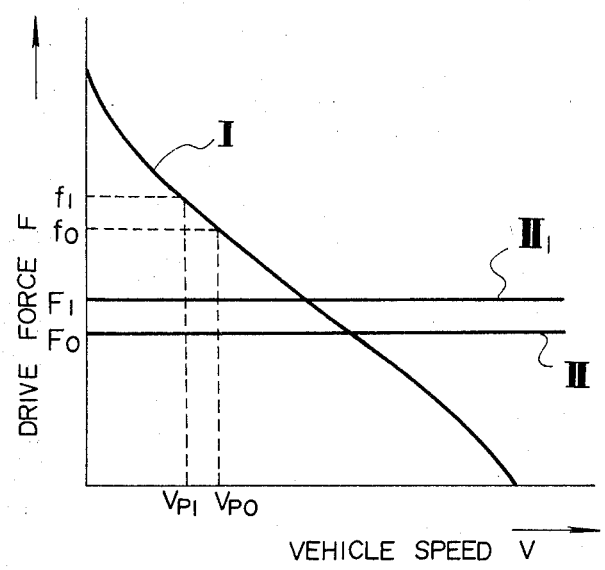
FIG. 1 is a graphical representation indicating construction vehicle running performance curves showing vehicle speed V with drive force F.

In FIG. 1, curve I indicates drive force F with vehicle speed; that is, it is a travelling performance curve inherent to a constructing vehicle, and curve II indicates the loss of drive force due to the weight of a vehicle itself, the loss being maintained unchanged even if the vehicle speed V is changed.

Figure 2:
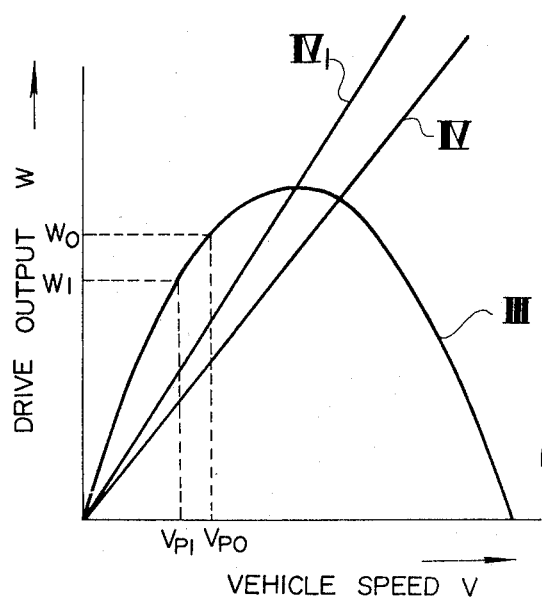
FIG. 2 is a graphical representation similar to that in FIG. 1, indicating drive output W with vehicle speed V.

A drive output W obtained by disregarding the vehicle travelling resistance corresponds to the product of the drive force F and the vehicle speed V in curve I in FIG. 1, and is indicated by curve III in FIG. 2 with respect to the vehicle speed V. In FIG. 2, straight line IV indicates the product of the drive force F and the vehicle speed V is straight line II in FIG. 1, thus representing the loss of drive output due to the weight of a vehicle itself mentioned above with respect to the vehicle speed V.

Accordingly, the output which can be used for actual work, i.e. an effective power of traction P is the difference between curves III and IV in FIG. 2. The relation between the effective power of traction P and the vehicle speed V is represented by curve C in FIG. 3.

Figure 3:
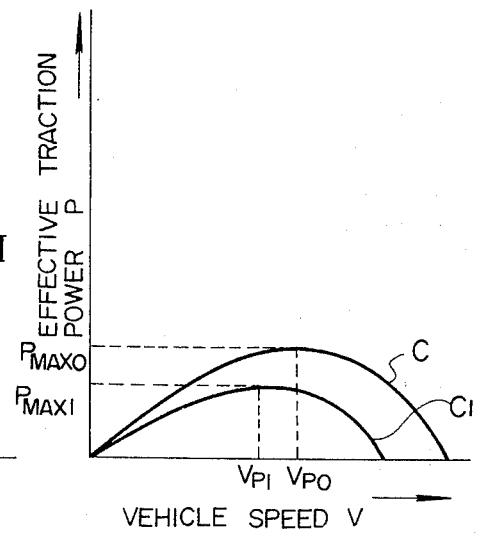
FIG. 3 is also a graphical representation indicating effective traction power P with vehicle speed V.

If the vehicle speed $V_{P0}$ at which the effective power of traction reaches the maximum value $P_{MAX0}$ is obtained from curve C in FIG. 3, then a drive force $f_0$ corresponding to the maximum value $P_{MAX0}$ can be read from curve I in FIG. 1.

If with the vehicle speed $V_{P0}$ or the drive force $f_0$ thus obtained as a desired value, the load of a working tool is controlled, then the maximum work efficiency which maximizes the effective power of traction under any working condition can be given to the vehicle. The vehicle speed $V_{P0}$ or the drive force $f_0$ previously obtained as the desired value is varied with time according to the working conditions, the types of work, etc. Accordingly, it is necessary to detect the variations. For this purpose, in a working tool control device according to this invention, the vehicle acceleration is detected to obtain the variation of the vehicle speed and the drive force $f_0$.

An output value $\alpha$ of an acceleration detector (such as an acceleration sensing type gradient detector) which is provided at a predetermined place on the vehicle can be represented by the sum of $dV/dt$ derived from vehicle speed variation and the inclined plane component $(g \cdot \sin \theta)$ of the gravity acceleration with a working plane gradient $\theta$. Of the output losses due to the above-described vehicle weight m, one due to acceleration is represented by $mV(dV/dt)$, and one due to the working plane gradient $\theta$ is expressed by $mV \cdot g \cdot \sin \theta$. The sum of these losses is $mV([dV/dt]+g \cdot \sin \theta)$ $(=mV\alpha)$ and can be readily calculated from the detected value $\alpha$ of the acceleration detector. Accordingly, the gradient of straight line IV indicating the output loss changes in proportion with the detected acceleration $\alpha$.

It is assumed that the vehicle acceleration is changed from $\alpha$ to $\beta$ ($\alpha < \beta$) due to the variations of the working conditions (for instance due to the acceleration or the vehicle inclination). Then the loss of the drive force due to the acceleration and the inclination is changed from $F_0 = m\alpha$ to $F_1 = m\beta$ (straight lines II and $II_1$ in FIG. 1) and the output loss is changed from $W_0 = m\alpha V$ to $W_1 = m\beta V$ (straight lines IV and $IV_1$ in FIG. 2). Thus, the effective traction power curve is changed from C to $C_1$ in FIG. 3. Accordingly, the maximum value of the effective traction power is changed from $P_{MAX0}$ to $P_{MAX1}$, as a result of which the vehicle speed is changed from $V_{P0}$ to $V_{P1}$ corresponding to these $P_{MAX0}$ and $P_{MAX1}$.

In contrast, when the vehicle acceleration is reduced from $\beta$ to $\alpha$, the effective traction power maximum value is changed from $P_{MAX1}$ to $P_{MAX0}$, and the corresponding vehicle speed is increased from $V_{P1}$ to $V_{P0}$.

Furthermore, the drive forces $f_0$ and $f_1$ corresponding to the maximum values $P_{MAX0}$ and $P_{MAX1}$ are changed similarly as in the case of the vehicle speeds $V_{P0}$ and $V_{P1}$ (FIG. 1, curve I).

It should be noted that the accelerations $\alpha$ and $\beta$ are not values inherent in the vehicle but values to be taken arbitrarily.

If the variation of the acceleration is detected as described above, then the desired speed or the variation of the drive force can be determined, and the maximum work efficiency maximizing the effective traction force under all the working conditions can be obtained.

One example of a load control device of this invention according to the above-described method is as shown in FIG. 4.

An acceleration detector 11 provided at a predetermined position on a vehicle outputs a signal $S\alpha$ representative of the present vehicle acceleration $\alpha$. The signal $S\alpha$ is applied to a memory unit 13.

A characteristic curve representing the relation between vehicle acceleration $\alpha$ and desired speed $V_P$ at maximum work efficiency has been stored in the memory unit 13. In the characteristic curve, acceleration signals $S\alpha$ are plotted on the horizontal axis, and desired speed signals $V_P$ on the vertical axis. Upon reception of an acceleration signal $S\alpha$, the memory unit 13 outputs a desired speed signal $V_P$ corresponding to the signal $S\alpha$.

A vehicle speed detector 12 is mounted, for instance, on an engine power line 17, to output a signal $S_V$ corresponding to the present vehicle speed V. The deviation $\Delta E (=V_P-S_V)$ between the signal $S_V$ and the signal $V_P$ is amplified by a compensation amplifier circuit 14. An actuator 15 is operated according to the deviation $\Delta E$, to move up and down a working tool. If a directionality is given to the operation of the working tool so that the working tool 16 is moved upwardly with $\Delta E > 0$ and moved downwardly with $\Delta E < 0$, then the load of the working tool can be controlled so that the deviation $\Delta E$ becomes zero (0), i.e. the present vehicle speed V reaches the desired speed $V_p$.

FIG. 5 shows another example of the load control device shown in FIG. 4. A characteristic curve representing the relation between vehicle acceleration and desired force $f_0$ at maximum work efficiency has been stored in a memory unit 23. Upon reception of an acceleration signal $S\alpha$, the memory unit 23 outputs a signal $V_{f0}$ corresponding to the input signal $S\alpha$.

A drive force detector 22 is mounted, for instance, on a power line 17, and operates to output a signal $S_f$ corresponding to the present drive force F. The deviation $\Delta E'$ between the signals $V_{f0}$ and $S_f$ is amplified. Similarly as in the case of the load control device in FIG. 4, the load of a working tool 16 is controlled according to the deviation $\Delta E'$ thus amplified.

Figure 6:
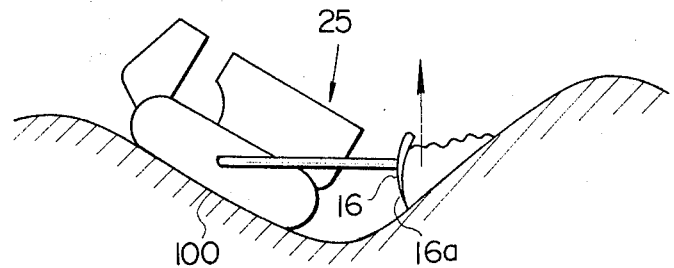
FIG. 6 is an explanatory diagram showing a working condition of a bulldozer on the ground which is curved inwardly.

In the above-described examples of the load control device, the load is controlled according to the vehicle acceleration (gradient) to maximize the effective traction power, but no topographic features such as for instance unevenness are taken into account. Accordingly, depending on the positional relationship between the vehicle and the working tool, the unevenness of the ground may be increased. For instance in the case of a downward slope as shown in FIG. 6, the vehicle speed is controlled to be higher (corresponding to a light load) than that in the case of the vehicle on the level ground, while the working tool 16 is pushed upwardly, as a result of which a component of the weight of the earth before the working tool 16 is added to the working tool 16; that is, the working tool load is heavier than that in the case where the vehicle is on the level ground, as a result of which the amount of excavation is decreased. In contrast in the case where the vehicle is on an upward slope, the vehicle speed is controlled to be slower (corresponding to a heavy load) than that in the case where the vehicle is on the level ground, while the gravity acceleration reduces the weight of the earth before the working tool 16, as a result the amount of excavation is increased. Thus, the degree of the unevenness of the ground is increased more and more. If the ground is made uneven as described above, it is necessary to level the ground before the next work starts. if, in the case where it is necessary to repeat the work, the ground is considerably uneven, the vehicle cannot run backwardly without decreasing the vehicle speed, as a result of which the cycle time is increased. Furthermore, as the vehicle runs on the uneven ground, the operator and various components of the vehicles are greatly fatigued, and it is necessary to frequently increase and decrease the vehicle speed and move up and down the working tool, thus uneconomically consuming the power. As is apparent from the above description, if the ground is uneven, then various problems occurs.

Examples of the load control device shown in FIGS. 9 and 10 are substantially similar to those shown in FIGS. 4 and 5; however, the former are different from the latter in that the position of the working tool with respect to the vehicle body is detected to correct the desired vehicle speed.

Figure 7:
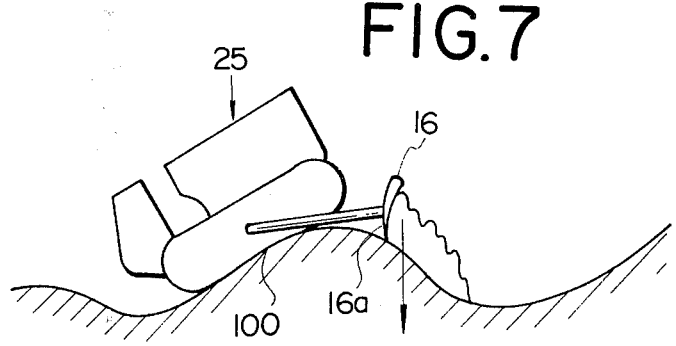
FIG. 7 is an explanatory diagram showing a working condition of the bulldozer on the ground which is curved outwardly.

First, let us consider the positional relation between the vehicle body and the working tool. As shown in the parts (a), (b) and (c) of FIG. 8, in the case where the ground to be leveled is flat, in general the positional relation between the vehicle body 25 and the working tool 16 is maintained unchanged, and in order to excavate the ground flatly it is necessary that the edge 16a of the working tool 16 is on the extension of a vehicle grounding plane 100. On the other hand, in the case where the ground to be leveled is uneven as shown in FIGS. 6 and 7, the working tool edge 16a must be held above (FIG. 6) or below (FIG. 7) the plane 100. Accordingly, the topographical convexity and concavity can be detected by detecting the position of the working tool 16 with respect to the vehicle body 25. The working tool is so controlled that when the ground is curved outwardly a low vehicle speed is employed (the load being increased) to remove the curved portion, and when the ground is curved inwardly, a high vehicle speed is employed (the load being decreased) to fill the curved portion with earth, thereby to eliminate the unevenness of the ground. In the case where the vehicle is, for instance, a bulldozer, the position of the working tool 16 with respect to the vehicle body 25 can be readily detected by detecting the stroke of a lift cylinder (not shown) adapted to move up and down the working tool, i.e. the blade 16 with a position detector such as a cylinder stroke detector. The cylinder stroke detector is known to detect the telescopic motion of the lift cylinder to output a position signal corresponding to the cylinder stroke.

A working tool position detector 30 is provided on the lift cylinder (not shown) of the working tool 16. The detector 30 operates to detect a cylinder stroke of the lift cylinder to output the corresponding position signal $S_L$. The signal $S_L$ is zero when the working tool edge 16a (FIG. 8) is on the prolongation of the vehicle body grounding plane 100. The signal $S_L$ has a positive value when the edge 16a is above the prolongation of the plane 100 (FIG. 6), and a negative value when below. The position of the working tool 16 corresponds to the stroke of the lift cylinder, and accordingly the signal $S_L$ corresponds to the position of the working tool 16 with respect to the vehicle body 25. A coefficient unit 31 operates to multiply the signal $S_L$ by a predetermined coefficient K to provide the corresponding position signal $S_L'$. The coefficient K is a value representative of the amount of unevenness with respect to the working tool position and the amount of vehicle speed correction with respect to the amount of unevenness, the value being determined from the size and capability of a vehicle. The desired vehicle speed signal $V_p$ is corrected with the aid of the position signal $S_L'$. More specifically, the correction is carried out in such a manner that, in the case where the ground has an outwardly curved portion, the desired vehicle speed is set to a low value so that the load is increased, to remove the curved portion, and in the case where the ground has an inwardly curved portion the desired vehicle speed is set to a high value so that the load is decreased, to fill the curved portion.

In FIG. 10 showing another embodiment of the load control device as shown in FIG. 9, the relation between vehicle acceleration $\alpha$ and desired drive force $f_0$ at maximum work efficiency is stored in a memory unit 23. The memory unit 23 receives an acceleration signal $S\alpha$ and provides a desired drive force signal $V_f$ corresponding to the acceleration signal $S\alpha$. Similarly as in the above-described case, the desired drive force signal $V_f$ is corrected with the aid of a position signal $S_L'$ to provide a corrected desired drive force signal $V_f'$. Then, the deviation $\Delta E'''$ between the corrected desired drive force signal $V_f'$ and a drive force signal $S_f$ corresponding to the present drive force F which is outputted by a drive force detector 22 is obtained. The drive force detector 22 is provided, for instance, on a power line 17, to output a signal $S_f$ corresponding to the present drive force F. Similarly as in the above-described load control device in FIG. 9, the load of the working tool 16 is controlled according to the deviation $E'''$ thus obtained.

Described below is another example of the load control device according to the invention, in which the traction force providing the maximum work efficiency is detected to provide a detection value, and the vertical movement of the working tool is controlled with the detection value as a target value.

FIG. 11 shows running performance characteristic curves. More specifically, curve I indicates traction force F with actual vehicle speed V, and curve II shows traction power P with traction force F. These curves I and II depend on the types of earth at a working site. The traction power P can be calculated from the following equation:

$$P = K \cdot F \cdot V \tag{1}$$

where K is a constant, F is the traction force, and V is the actual vahicle speed.

If, in FIG. 11, the effective traction power P providing the maximum work efficiency is represented by $P_0$, then the corresponding traction force is $f_0$. Therefore, if the vertical movement of the working tool is controlled with the traction force $f_0$ as the target value so that the traction force reaches $f_0$, then the maximum work efficiency is obtained.

At the working site, the vehicle is run under various load conditions to detect the traction forces and actual vehicle speeds to prepare a graph as shown in FIG. 11. Referring to the graph thus prepared, a traction force providing a maximum earth-moving is obtained, so that the vertical movement of the working tool is controlled with the traction force as the desired value.

A device for detecting the above-described traction force will be described. In this example, the traction force is detected with a strain gauge provided on the engine power line.

FIG. 12 is a block diagram showing the engine power line. The output of an engine 35 is transmitted through a torque converter 36 and a coupling shaft 37 to a sprocket 39.

The traction force detecting strain gauge is provided at a suitable position on the coupling shaft 37 through which the torque converter 36 is coupled to a transmission gear 38. In general, the strain $\epsilon$ of the coupling shaft 37 is in linear relation to the torque of the coupling shaft 37, i.e. the traction force F, as shown in FIG. 13. Therefore, the traction force F can be detected by detecting the strain $\epsilon$ of the coupling shaft 37.

However, it should be noted that if the strain gauge is mounted on the coupling shaft 37, then it is difficult to read the output of the strain gauge, because the gauge is turned together with the coupling shaft 37.

In order to eliminate this difficulty, in the invention, an FM (frequency modulation) transmission system is employed to read the output of the strain gauge on the coupling shaft.

FIG. 14 shows one example of the FM transmission system.

In FIG. 14, the strain $\epsilon$ which has been detected by a strain gauge 40 is applied through a bridge amplifier 41 to an FM modulator 42. In the FM modulator 42, the output signal of the bridge amplifier 41, which corresponds to the strain $\epsilon$, is subjected to frequency modulation, and is then transmitted through an FM transmitter 43. The signal thus transmitted is received by an FM receiver 45 and is then demodulated by an FM demodulator 44. As a result, the FM demodulator 44 outputs a signal $e_c$ corresponding to the strain, i.e. the traction force F.

The above-described strain gauge 40, bridge amplifier 41, FM modulator 42 and FM transmitter 43 form a signal transmitting section 50, which is provided on the coupling shaft 37. The above-described FM receiver 45 and FM demodulator 44 form a signal receiving section 51, which is provided in the vicinity of the operating board near the operator.

FIG. 15 shows one concrete example of the blade load control device according to the invention, which is applied to a bulldozer.

In FIG. 15, a traction force detector 60 operates to detect the traction force of the bulldozer 25 to output a signal $e_c$ corresponding to the traction force thus detected. The traction force detector 60 may be the one as shown in FIG. 14.

A vehicle speed detector 12 operates to output an actual vehicle speed signal $e_B$ corresponding to an actual vehicle speed $V_B$. The vehicle speed detector 12 may be a Doppler radar which can be mounted on a vehicle. The Doppler radar emits an electromagnetic wave from the rear part of the vehicle body towards the ground, and outputs the actual vehicle speed signal $e_B$ of the bulldozer by detecting the difference in frequency between the electromagnetic wave and its reflection wave. Instead of the above-described Doppler radar, a Doppler radar which is set on the ground may be used.

An arithmetic display unit 61 calculates an effective traction output $P (=k' \cdot e_B \cdot e_c)$ by using the signals $e_B$ and $e_c$, and displays the resultant value as a function of the traction force F.

Accordingly, after running the bulldozer 25 under various load conditions, the operator can read a traction force F providing a maximum earth-moving amount from the contents displayed on the arithmetic display unit 61.

The traction force signal $e_f$ which corresponds to the traction force $f_0$ which has been read by the operator as described above is set in a signal setting unit 62. The signal setting unit 62 comprises, for instance, a potentiometer with a dial, to set the traction force signal $e_f$ as a voltage value.

The output signal $e_f$ of the signal setting unit 62 is applied to an adder AP, so that the output signal $e_c$ of the detector 60, which represents the traction force F, is subtracted from the signal $e_f$. The deviation $\Delta e$ ($=e_f - e_c$) between these two outputs is applied through an amplifier 63 and a compensation circuit 64 (carrying out PID compensation, for instance) to control operation unit 65.

The unit 65 outputs voltage corresponding to the deviation $\Delta e$ applied thereto. It is desirable that the control operation section 65 is so designed that, when the deviation voltage $\Delta e$ is very low, it does not respond to such a low deviation voltage. When the deviation voltage $\Delta e$ is positive, the control operation section 65 outputs a positive voltage $V_0$ corresponding thereto, and when it is negative, the unit 65 outputs a negative voltage $-V_0$.

The output voltage of the control operation unit 65 is applied through a drive unit 66 to an electromagnetic valve 67 to operate the latter 67. The electromagnetic valve 67 operate to supply hydraulic oil to a hydraulic cylinder 68 to move a blade 69 up or down, and to control the load of the blade 69 so that the detected traction force F reaches the set traction force $f_0$.

In the case where the detected traction force F is smaller than the set traction force $f_0$, the deviation voltage $\Delta e$ is negative, so that the electromagnetic valve 67 is switched to the position 67a. As a result, the hydraulic cylinder 68 is contracted to raise the blade 69 to decrease the load, so that the traction force F by the bulldozer 26 is increased to reach the set traction force $f_0$.

On the other hand, in the case where the detected traction F is larger than the set traction force $f_0$, the deviation voltage $\Delta e$ is negative, so that the electromagnetic valve 67 is switched to the position 67b. As a result, the hydraulic cylinder 68 is stretched to lower the blade 69 to increase the load, so that the traction force F by the bulldozer 25 is decreased to reach the set traction force $f_0$.

Thus, the traction force of the vehicle is controlled to the value set by the signal setting unit 62, i.e. the traction force $f_0$ providing the maximum traction power.

Another example of the load control device in which a track speed is selected as a desired value providing a maximum work efficiency, is described.

FIG. 16 shows running performance curves I and II inherent to a bulldozer under no load, and effective running performance curves III and IV depending on the type of earth at a working site.

In each of curves I and III, a traction force F is expressed as a function of a track speed $v_c$ and an actual vehicle speed $v_B$. Curve I can be approximated by the following equation:

$$F(v_c) = -k' v_c + Fm \qquad (2)$$

where $k'$ is a constant and Fm, maximum traction force under no load.

In curve II, a traction force F in the case when no load is applied to the bulldozer is expressed as a function of a track traction power and an effective traction power. In curve IV, a traction force F in the case when load in certain types of earth is applied to the bulldozer is expressed as a function of a track traction power and an effective traction power. The effective traction power P can be expressed by the following equation:

$$P = k \cdot F(v_c) \cdot v_B \qquad (3)$$

where $k$ is a constant.

Thus, the effective traction power P can be determined from the actual vehicle speed $v_B$ and the traction force F. As is apparent from equation (2), the traction force F is obtained by detecting the track speed $v_c$. Accordingly, the effective traction power P can be obtained by detecting the actual vehicle speed $v_B$ and the track speed.

As is clear from FIG. 16, in order to provide the maximum work efficiency, it is necessary that the effective traction power P has the maximum value. In this case, referring to curve I, the track speed is $v_{co}$. Accordingly, it is necessary to obtain curve IV first. Then, referring to curve IV, the maximum value of the effective traction power P is obtained, and then the track speed $v_{co}$ corresponding to the maximum value is obtained. If the vertical movement of the blade is controlled with the track speed $v_{co}$ as the target value, then the maximum work efficiency can be obtained.

In FIG. 17, a track speed detector 70 is provided to detect the track speed $v_c$ of a bulldozer 25 to output a signal $e_c$ corresponding to the detected track speed $v_c$. A proximity switch for detecting the protrusion and recession of a universal joint coupling the torque converter output shaft and the transmission gear input shaft may be employed as the detector in such a manner that it detects the track speed $v_c$ from the repetitive period of the protrusion and recession.

The vehicle speed detector 12 operates to output an actual vehicle speed signal $e_B$ corresponding to an actual vehicle speed $v_B$. The vehicle speed detector 12 may be a Doppler radar which is mounted on a vehicle. The Doppler radar emits an electromagnetic wave from the rear part of the vehicle body towards the ground, to detect the actual vehicle speed of the bulldozer from the difference in frequency between the electromagnetic wave thus emitted and its reflection wave. Instead of the above-described Doppler radar, a Doppler radar which is set on the ground can be employed.

An arithmetic circuit 71 operates to calculate the effective traction power $P (=k \cdot F(v_c) \cdot v_B)$ by using the signals $e_B$ and $e_c$, to output a signal $e_A$ corresponding to the effective traction power P.

A curve display unit 72 receives and stores the signal $e_c$ representative of the track speed detected by the detector 70 and the effective traction power P calculated by the arithmetic circuit 71, to display the running performance curve.

The display of the running performance curve is achieved as follows: At a working site, the load is varied manually (by moving up and down the blade) to detect the track speeds $v_c$ and the actual vehicle speeds $v_B$. Referring to equation (2) described above, traction forces F are obtained by using the track speeds $v_c$. Furthermore, referring to equation (3), effective traction powers P are obtained by using the traction forces F and the actual vehicle speeds $v_B$. The various values thus obtained are plotted, to achieve the display of the running performance curve.

A signal setting unit 62 operates to set a speed signal $e_p$ corresponding to the track speed $v_{co}$ which has been read by the operator as described above. The unit 62 comprises, for instance, a potentiometer with a dial, so that the speed signal $e_p$ is set as the corresponding voltage value.

The curve display unit 72 and the signal setting unit 62 are mounted on the operating board, so that the operator can readily read the curve on the display unit 72 and the track speed $v_{co}$ can be set as the voltage value by the setting unit 62.

The output signal $e_p$ of the signal setting unit 62 is applied to an adder AP, which in turn outputs the deviation $\Delta e' (=e_p - e_c)$ between the signal $e_p$ and the signal $e_c$ representative of the track speed which is outputted by the detector. The deviation $\Delta e'$ is applied through an amplifier 63 and a compensation circuit 64 (carrying out PID compensation, for instance) to a control operation unit 65.

The control operation unit 65 outputs a voltage corresponding to the deviation $\Delta e'$ applied thereto. More specifically, when the deviation voltage $\Delta e'$ is positive, the control operation unit 65 outputs a positive voltage $V_0$ corresponding to the deviation, and when negative, the unit 65 outputs a negative voltage $-V_0$.

The output voltage of the control operation unit 65 is applied through a drive unit 66 to an electromagnetic valve 67 to operate the latter 67. The electromagnetic valve 67 operates to supply hydraulic oil to a hydraulic cylinder 68 to move the blade 69 upwardly or downwardly whereby the load of the blade 69 is controlled so that the track speed $v_c$ reaches the set speed $v_{co}$.

When the detected speed $v_c$ is lower than the set speed $v_{co}$, the deviation voltage $\Delta e'$ is positive, so that the electromagnetic valve 67 is switched to a position 67a. As a result, the hydraulic cylinder 68 is contracted, so that the blade 69 is raised, the load is decreased, and the vehicle speed is increased to reach the set speed $v_{co}$. When the detected speed $v_c$ is higher than the set speed $v_{co}$, the deviation voltage $\Delta e'$ is negative, so that the electromagnetic valve 67 is switched to a position 67b. As a result, the hydraulic cylinder 68 is stretched to lower the blade 69 to increase the load, so that the vehicle speed is decreased to reach the set speed.

Thus, the vehicle speed is controlled to the value set by the setting unit 62, i.e. the speed $v_{co}$ for the maximum traction power.

While the invention has been described with reference to the cases where the technical concept is applied to a bulldozer, it is obvious that the technical concept of the invention is equally applicable to other earth-moving machines such as for instance a motor grader.

What is claimed is:

1. A load control device for a working tool which is mounted on a construction vehicle to excavate and carry earth, which comprises:
    an acceleration detector for detecting acceleration of said vehicle;
    a memory unit storing a characteristic curve representative of the relation of said acceleration to a desired vehicle speed at which a maximum work efficiency is provided, wherein said memory unit receives the output of the acceleration detector, and provides an output in response thereto representative of the desired vehicle speed;
    a speed detector for detecting a vehicle speed; and
    a control circuit for controlling a load applied to said working tool according to the difference between said desired vehicle speed which is read out of said memory unit and the actual vehicle speed as provided at the output of said speed detector.

2. A load control device for a working tool which is mounted on a construction vehicle to excavate and carry earth, which comprises:
    an acceleration detector for detecting acceleration of said vehicle;
    a memory unit storing a characteristic curve representative of the relation of said acceleration to a desired vehicle drive force at which a maximum work efficiency is provided, wherein said memory unit receives the output of the acceleration detector, and provides an output in response thereto representative of the desired vehicle speed;
    a drive force detector for detecting a vehicle drive force; and
    a control circuit for controlling a load applied to said working tool according to the difference between an output of said drive force detector and an output of said memory unit.

3. A device as claimed in claim 1, in which said memory unit is a read-only memory.

4. A device as claimed in claim 1, in which said memory unit is a function generator.

5. A device as claimed in claim 1, which further comprises a working tool position detector for detecting the position of said working tool with respect to said vehicle, to provide a position signal to correct said desired vehicle speed.

6. A device as claimed in claim 2, which further comprises a working tool position detector for detecting the position of said working tool with respect to said vehicle, to provide a position signal to correct said desired drive force.

7. A device for controlling the load on a working tool mounted on a construction vehicle used to excavate earth, comprising:
    a memory device for storing a characteristic curve representative of the relation of a first operating parameter of the construction vehicle to a second operating parameter of the construction vehicle at which maximum work efficiency is achieved;
    first detection means for determining the value of the second operating parameter and providing said determined value to the memory device, wherein the memory device will provide an output representing the desired value of the first operating parameter corresponding to the present value of second operating parameter;
    second detection means for determining the actual value of the first operating parameter; and
    feedback means for comparing the actual and desired values of the first operating parameter and correcting the first operating parameter to equal the desired value, wherein the first parameter is vehicle speed and the second parameter is vehicle acceleration.

8. A device for controlling the load on a working tool mounted on a construction vehicle used to excavate earth, comprising:
    a memory device for storing a characteristic curve representative of the relation of a first operating parameter of the construction vehicle to a second operating parameter of the construction vehicle at which maximum work efficiency is achieved;
    first detection means for determining the value of the second operating parameter and providing said determined value to the memory device, wherein the memory device will provide an output representing the desired value of the first operating parameter corresponding to the present value of second operating parameter;
    second detection means for determining the actual value of the first operating parameter; and
    feedback means for comparing the actual and desired values of the first operating parameter and correcting the first operating parameter to equal the desired value, wherein the first parameter is drive force applied to the vehicle and the second parameter is vehicle acceleration.

* * * * *